(12) United States Patent
Kakarlapudi et al.

(10) Patent No.: US 12,462,327 B2
(45) Date of Patent: Nov. 4, 2025

(54) GRAPHICS PROCESSING SYSTEMS

(71) Applicant: Arm Limited, Cambridge (GB)

(72) Inventors: Sandeep Kakarlapudi, Trondheim (NO); Andreas Engh-Halstvedt, Trondheim (NO); Frank Klaeboe Langtind, Trondheim (NO)

(73) Assignee: Arm Limited, Cambridge (GB)

( * ) Notice: Subject to any disclaimer, the term of this patent is extended or adjusted under 35 U.S.C. 154(b) by 207 days.

(21) Appl. No.: 18/249,342

(22) PCT Filed: Oct. 19, 2021

(86) PCT No.: PCT/GB2021/052695
§ 371 (c)(1),
(2) Date: Apr. 17, 2023

(87) PCT Pub. No.: WO2022/084666
PCT Pub. Date: Apr. 28, 2022

(65) Prior Publication Data
US 2023/0401667 A1     Dec. 14, 2023

(30) Foreign Application Priority Data

Oct. 20, 2020   (GB) ..................................... 2016609

(51) Int. Cl.
*G06T 1/20*       (2006.01)
*G06T 11/40*      (2006.01)
*G06T 15/40*      (2011.01)

(52) U.S. Cl.
CPC ................ *G06T 1/20* (2013.01); *G06T 11/40* (2013.01); *G06T 15/40* (2013.01); *G06T 2210/12* (2013.01)

(58) Field of Classification Search
CPC ........ G06T 1/20; G06T 11/40; G06T 2210/12
See application file for complete search history.

(56) References Cited

U.S. PATENT DOCUMENTS

2008/0150950 A1*  6/2008  Sorgard ................. G06T 11/40
                                                        345/530
2010/0177105 A1*  7/2010  Nystad .................. G06T 15/005
                                                        345/553
(Continued)

FOREIGN PATENT DOCUMENTS

EP     3690821 A1    8/2020
GB     2578320 A     5/2020

OTHER PUBLICATIONS

Zhai Rui, et al., "GPU-based real-time terrain rendering: Design and implementation" Neurocomputing, vol. 171, Jan. 1, 2016 (Jan. 1, 2016), pp. 1-8, XP029298832, ISSN: 0925-2312, DOI: 10.1016/J.NEUCOM.2014.08.108 abstract p. 3 p. 4.
(Continued)

*Primary Examiner* — Kee M Tung
*Assistant Examiner* — Khoa Vu
(74) *Attorney, Agent, or Firm* — Pearl Cohen Zedek Latzer Baratz LLP

(57) ABSTRACT

A method of operating a graphics processor to process sets of geometry to generate an output. Each set of geometry is associated with lower level geometry including vertex data to be used when rendering the geometry as well a separate higher level representation of the geometry. The higher level representations of the geometry can be obtained by the graphics processor independently of the other, lower level geometry and used to determine which sets of geometry should be processed for which regions of the output. Once this determination is made, the regions can be rendered by obtaining and processing the lower level geometry accordingly.

21 Claims, 8 Drawing Sheets

(56) References Cited

U.S. PATENT DOCUMENTS

2014/0118364 A1* 5/2014 Hakura ............... G06T 1/60
  345/505
2023/0260074 A1* 8/2023 Brigg ............... G06F 9/5027

OTHER PUBLICATIONS

Anglada Marti, et al., "Rendering Elimination: Early Discard of Redundant Tiles in the Graphics Pipeline", 2019 IEEE International Symposium on High Performance Computer Architecture (HPCA), IEEE, Feb. 16, 2019 (Feb. 16, 2019), pp. 623-634, XP033532526, DOI: 10.1109/HPCA.2019.00014the whole document.
Combined Search and Examination Report under Sections 17 and 18(3), dated Jul. 21, 2021, GB Patent Application GB2016609.6.
International Search Report and Written Opinion, dated Jan. 25, 2022, International Application No. PCT/GB2021/052695.

* cited by examiner

GRAPHICS PROCESSING SYSTEMS

BACKGROUND

The technology described herein relates to computer graphics processing and in particular to the processing of geometry during the rendering of an output.

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, or groups thereof.

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives (or, generally, sets of geometry) that use those vertices. For a given frame, there may, e.g., be of the order of a few thousand draw calls, and hundreds of thousands (or potentially millions) of primitives.

Once primitives and their vertices have been generated and defined, they can be processed by the graphics processing system, in order to generate the desired graphics processing output (render target), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively. (The term "rasterisation" is sometimes used to mean both primitive conversion to sample positions and rendering. However, herein "rasterisation" will be used to refer to converting primitive data to sampling point addresses only.)

The rasterising and rendering processes use the vertex attributes associated with the vertices of the primitives that are being processed. To facilitate this operation, the attributes of the vertices defined for the given graphics processing output (e.g. draw call) are usually subjected to an initial so-called "vertex shading" operation, before the primitives are rasterised and rendered. This "vertex shading" operation operates to transform the attributes for each vertex into a desired form for the subsequent graphics processing operations. This may comprise, for example, transforming vertex position attributes from the model space that they are initially defined for to the screen space that the output of the graphics processing is to be displayed in.

A graphics processing pipeline will typically therefore include a vertex shading stage (a vertex shader) that executes vertex shading computations on the initial vertex attribute values defined for the vertices so as to generate a desired set of output vertex attributes (i.e. appropriately "shaded" attributes) for use in subsequent processing stages of the graphics processing pipeline.

Once the vertex attributes have been shaded, the "shaded" attributes are then used when processing the vertices (and the primitives to which they relate) in the remainder of the graphics processing pipeline.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". In such arrangements, the render output is typically divided (by area) into regularly-sized and shaped rendering tiles (they are usually e.g., squares or rectangles). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile-based graphics processing pipeline, the geometry (primitives) for the render output being generated is sorted into regions of the render output area, so as to allow the geometry (primitives) that need to be processed for a given region of the render output to be identified. This sorting allows primitives that need to be processed for a given region of the render output to be identified (so as to, e.g., avoid unnecessarily rendering primitives that are not actually present in a region). The sorting process produces lists of primitives to be rendered for different regions of the render output (commonly referred to as "primitive" or "tile" lists). Once the primitive lists have been prepared for all the render output regions, each rendering tile is processed, by rasterising and rendering the primitives listed for the rendering tile.

The process of preparing primitive lists for regions of the render output basically therefore involves determining the primitives that should be processed for a given render output region. This process is usually carried out by determining (at a desired level of accuracy) the primitives that intersect (i.e. that will appear (at least in part) within) the render output region in question, and then preparing a list of those primitives for future use by the graphics processing system. Thus, for each primitive to be processed, the graphics processor reads in the associated vertex data, converts the vertex positions at least to screen space (vertex shading), and then determines using the shaded vertex positions for each primitive which region(s) of the render output the primitive at least partially covers (and so should therefore be rendered for).

It should be noted here that where a primitive falls into more than one render output region, as will frequently be the case, it is included in the primitive list for each region that it falls within. A render output region for which a primitive list is prepared could be a single rendering tile, or a group of plural rendering tiles, etc.

In effect, each render output region can be considered to have a bin (the primitive list) into which any primitive that is found to fall within (i.e. intersect) the region is placed (and, indeed, the process of sorting the primitives on a region-by-region basis in this manner is commonly referred to as "binning").

Thus, in a traditional tile-based processing system there will be an initial processing pass that reads in the vertex data for all of the primitives to be processed for the entire render output in question, performs the vertex shading, and any other desired geometry processing, and then, in effect, sorts the graphics primitives into regions that the render output has been divided into for sorting purposes. After all of the geometry has been processed, and the primitives have been sorted into respective regions, the tiles are then rendered separately, typically one after another, in a second, deferred processing pass, and the rendered tiles recombined to provide the complete render output (e.g. a frame, or a portion of a frame, for display).

The Applicants believe there remains scope for providing alternative, improved graphics processing systems.

BRIEF DESCRIPTION OF THE DRAWINGS

Like reference numerals are used for like elements in the drawings as appropriate.

DETAILED DESCRIPTION

Figure 1:
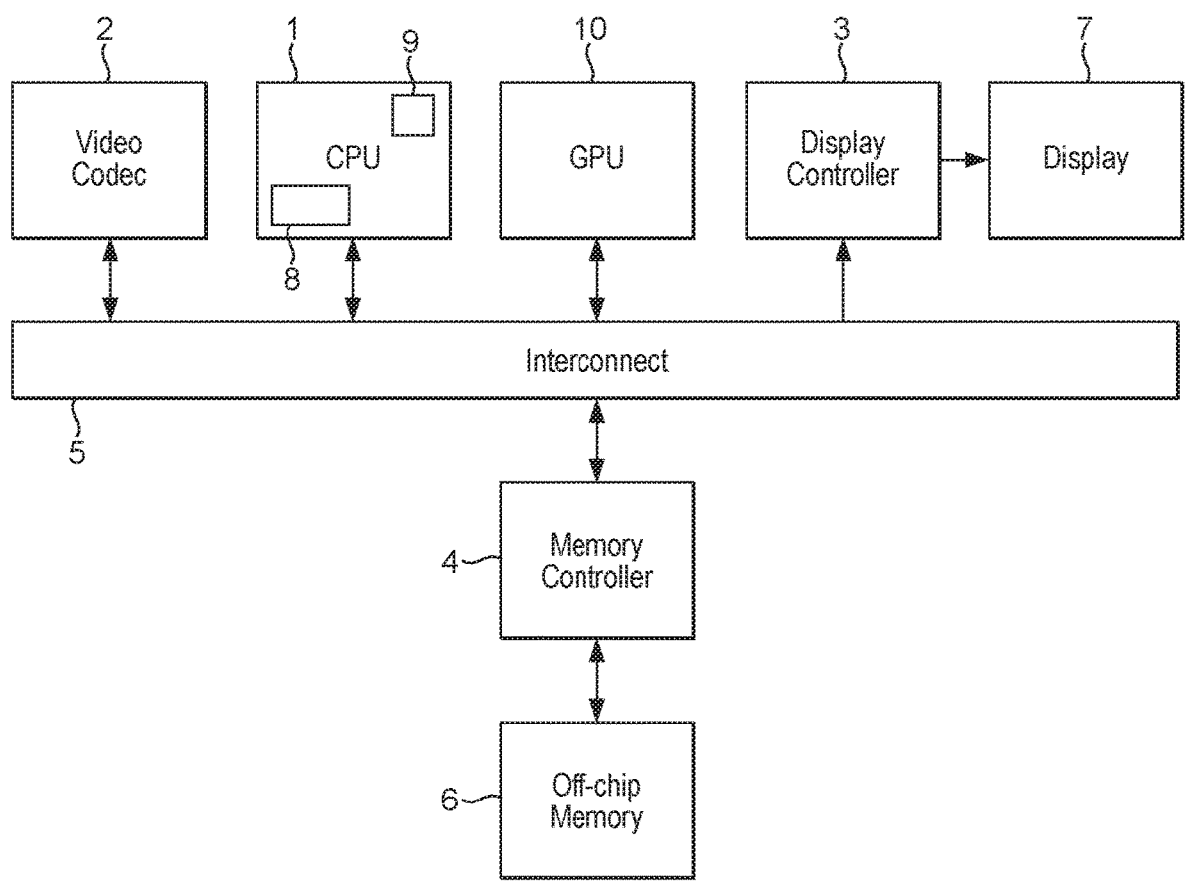
FIG. 1 shows an example of a graphics processing system within which the technology described herein could be implemented.

A first embodiment of the technology described herein comprises a method of operating a graphics processing system, the graphics processing system including:
one or more host processor for executing an application; and
a graphics processor operable to process sets of geometry for an application that is executing on the one or more host processor in order to generate a render output for the application,
the method comprising:
when processing plural sets of geometry for the render output, wherein each set of geometry is associated with respective lower level geometry data that is to be used when rendering the set of geometry, the associated lower level geometry data for a set of geometry including vertex data representing a set of vertices for the geometry in the set of geometry, and wherein each set of geometry is further associated with a higher level representation of the position of the set of geometry, the higher level representation of the position of the set of geometry being separate and in addition to the associated lower level geometry data for the set of geometry and being obtainable by the graphics processor independently of the associated lower level geometry data:
for each set of geometry to be processed:
the graphics processor obtaining the higher level representation of the position of the set of geometry; and
the graphics processor determining, using the higher level representation of the position of the set of geometry, which region or regions of a plurality of regions ("hypertiles") into which the render output has been divided, the set of geometry should be processed for, wherein each region comprises a respective area of the render output;
the graphics processor thereby generating one or more ("hypertile") lists indicating which sets of geometry should be processed for which regions of the render output;
the method further comprising:
after the one or more ("hypertile") lists indicating which sets of geometry should be processed for which regions of the render output have been generated:
for a region of the render output to be rendered:
determining using the respective ("hypertile") list(s) for the region of the render output which sets of geometry should be processed for the region of the render output;
obtaining the associated lower level geometry data for each of the sets of geometry that are indicated to be processed for the region, the obtained lower level geometry data including the vertex data representing the vertices for the geometry in the sets of geometry that are indicated to be processed for the region; and
processing the obtained lower level geometry data to generate a render output.

A second embodiment of the technology described herein comprises a graphics processing system, the graphics processing system including:
one or more host processor for executing an application; and
a graphics processor operable to process sets of geometry for an application that is executing on the one or more host processor to generate a render output for the application.
the graphics processor including:
a sorting circuit that is configured to:
when processing plural sets of geometry for a render output, wherein each set of geometry is associated with respective lower level geometry data that is to be used when rendering the set of geometry, the associated lower level geometry data for a set of geometry including vertex data representing a set of vertices for the geometry in the set of geometry, and wherein each set of geometry is further associated with a higher level representation of the position of the set of geometry, the higher level representation of the position of the set of geometry being separate and in addition to the associated lower level geometry data for the set of geometry and being obtainable by the graphics processor independently of the associated lower level geometry data:
for each set of geometry to be processed:
cause the graphics processor to obtain the higher level representation of the position of the set of geometry;
determine, using the higher level representation of the position of the set of geometry, which region or regions of a plurality of regions ("hypertiles") into which the render output has been divided the set of geometry should be processed for, wherein each region comprises a respective area of the render output; and
thereby generate one or more ("hypertile") lists indicating which sets of geometry should be processed for which regions of the render output;
the graphics processor further including a rendering circuit that is configured to render regions of the render output by:
for each region to be rendered:
the rendering circuit determining using the respective ("hypertile") list(s) for the region of the render output which sets of geometry should be processed for the region of the render output;

the rendering circuit obtaining the associated lower level geometry data for each of the sets of geometry that are indicated to be processed for the region, the obtained lower level geometry data including the vertex data representing the vertices for the geometry in the sets of geometry that are indicated to be processed for the region; and the rendering circuit processing the obtained lower level geometry data to generate a render output.

In the technology described herein, the graphics processor operates under the control of a host processor (or group of host processors) to process sets of geometry that have been specified by an application such as a game executing on the host processor(s) in order to generate a render output for the application (which may, e.g., comprise at least a part of a frame to be displayed). In particular the graphics processor is operable to process plural sets of geometry for the render output (e.g. frame) using associated "lower level" geometry data representing the geometry in the sets of geometry. For example, each set of geometry that is to be processed has associated (lower level) geometry data representing the geometry in the set of geometry, e.g., and in an embodiment, in terms of a set of vertex indices identifying the vertices for the geometry in the set of geometry and a set of respective attribute data for those vertices, and the processing of the geometry (rendering) is in an embodiment performed using such vertex data.

However, in the technology described herein, prior to processing the geometry to generate the render output, an initial "higher level" sorting of the geometry into different regions of the render output is performed, e.g., and in an embodiment, at a higher level than the level of the individual vertices themselves. That is, according to the technology described herein, the render output (e.g. frame) is divided into a plurality of regions for sorting, with each region including a respective area of the render output, and an initial sorting of the geometry is then performed, e.g., and in an embodiment, in a first processing pass, to sort the sets of geometry into the different regions of the render output.

To facilitate such initial higher level sorting of the geometry, according to the technology described herein, a "higher level" representation of the position of the set of geometry is specified for each set of geometry, e.g., and in an embodiment, by the application that requires the graphics processing (although the higher level representations could in other embodiments be provided to the graphics processor in other ways, as will be explained further below). The higher level representation of the position of the set of geometry is in the technology described herein specified separately and in addition to the (lower level) geometry data itself (e.g., separately and in addition to the vertex indices and the associated attribute data, etc.), and hence can be provided to the graphics processor separately to, and independently of, the lower level geometry data that is to be used for the rendering. The initial sorting of the geometry into the different regions of the render output can then be (and is) performed on the basis of such higher level representations of the positions of the sets of geometry, e.g., and in an embodiment, without the graphics processor having at this stage to obtain or process the individual vertex positions (or any other such lower level geometry data).

In other words, the initial sorting in the technology described herein can be performed using (only) the higher level representations of the positions of the sets of geometry, which are specified separately and in addition to the other geometry data (including the vertex indices, vertex attribute data, etc.), and stored in such a manner that the graphics processor is able to obtain the higher level representation for a (and any) given set of geometry, and perform the initial sorting operation accordingly, without having to obtain any of the other, lower level geometry data associated with the set of geometry. According to the technology described herein there is therefore no need to process (or obtain) the full geometry data including the individual vertices to perform this initial higher level sorting of the geometry (and in an embodiment therefore this is not done).

Thus, the technology described herein performs an initial sorting of the sets of geometry into the different regions of the render output that in an embodiment involves a relatively 'coarser' sorting of the geometry, and can in an embodiment therefore be done relatively quickly, with reduced processing burden (e.g. at least compared to the subsequent processing stages where the geometry data is processed in full).

This up-front sorting of the geometry into the different regions into which the render output has been divided means the graphics processor is better able exploit spatial locality in the geometry data, e.g., and in an embodiment, such that once the initial geometry sorting has been performed, different regions of the render output can then be processed (rendered) independently (e.g. in parallel).

This then means that the amount of data to be transferred to/from memory at any particular instant is in an embodiment reduced, at least compared to some more traditional graphics processing arrangements.

For example, the input geometry data (e.g. the vertex indices and the associated vertex attribute data) that is used for the rendering operations may typically be stored in a memory system, e.g., in "off-chip" memory, i.e. memory that is external to the graphics processor, such as a portion of main memory (and this is the case in embodiments of the technology described herein). Thus, in order to process (render) a set of geometry for the render output, the graphics processor may first need to read in the associated geometry data for the set of geometry from the memory system, and then process it accordingly.

Reading in all of the geometry that may be required for a given render output may require significant memory bandwidth. This is mitigated in the technology described herein by the initial sorting of the sets of geometry into the different regions of the render output.

For instance, because the initial sorting of the sets of geometry can be (and in an embodiment is) performed using (only) the higher level representations of the positions of the sets of geometry, it is only the higher level representations of the positions of the sets of geometry that need to be obtained to perform the initial sorting. However, there is no need to read in the full (lower level) geometry data including the individual vertices, etc., at this point, and so this is therefore in an embodiment not done. This means that the amount of data that needs to be obtained at this stage can therefore be reduced (e.g. when compared to perform an initial sorting of the geometry data that needs the vertices themselves, e.g. as may be the case in a more traditional tile-based graphics processing system).

Furthermore, as mentioned above, as a result of the initial sorting of the geometry into the different regions of the render output, the spatial locality of the geometry is then known, and this means that each region can be rendered separately (e.g. in parallel). The technology described herein may therefore enable a more effective parallelisation of the rendering operation for the different regions.

Furthermore, when it is desired to render a particular region, or group of regions, the graphics processor needs only to obtain and process the associated geometry data for the sets of geometry that are indicated to be processed for that region, or regions. This then helps to reduce the amount of in-flight geometry data that needs to be stored and processed since only the geometry data for the sets of primitives that are indicated to be processed for a particular region (or regions) that is currently being rendered needs to be stored and processed at that time.

In particular, the amount of transformed geometry data that is in-flight at any time will be reduced, and it may accordingly be possible to retain most or all of that data locally (e.g. in the L2 cache), thereby reducing or avoiding the need to transfer such transformed geometry data to and from, memory during the rendering.

Therefore the technology described herein may provide certain improvements, e.g. compared to more traditional graphics processing systems, as will be explained further below.

In the technology described herein the graphics processor is configured, e.g., and in an embodiment, in a first processing pass, to perform such initial sorting operation. In this way the graphics processor is operable to generate one or more list(s) indicating which sets of geometry should be processed for which regions of the render output. For example, a respective list may be generated for each respective region of the render output indicating which sets of geometry are to be processed for that region. Or, for at least some regions, a list may be generated for groups of plural regions of the render output. Various arrangements would be possible in this regard.

The rendering of a (and each) region can then be performed, e.g., and in an embodiment, in a second or further processing pass, using the respective, generated list(s) indicating which sets of geometry should be processed for that region, as will be explained further below.

Thus, in the technology described herein, the initial sorting is performed using a "higher level" representation of the position of the set of geometry (as a whole), which higher level representation may be, e.g., and in an embodiment is, a bounding box for the set of geometry. Moreover this higher level representation of the position of the set of geometry (e.g. bounding box) is in an embodiment specified and provided by the application that requires the graphics processing (rather than the graphics processor having to obtain and process the individual vertex positions for the geometry in the set of geometry as part of the initial sorting operation).

This then saves the need for the graphics processor to perform all of the geometry-related processing up-front, e.g. as may be done in more traditional tile-based rendering systems. This may in turn help reduce the overall latency (time required) for drawing a frame.

Thus, according to the technology described herein, the initial sorting of the sets of geometry (the "hypertiling" operation) determines which regions of the render output a set of primitives should be processed for, and then stores this information (in one or more list(s)), but it is a benefit of the technology described herein that all of the other geometry and fragment processing can be (and in an embodiment is) effectively "deferred", e.g. until a second or further processing pass.

In this way the technology described herein in an embodiment reduces the amount of in-flight geometry-related data that may be required/generated at any time, and thereby in an embodiment reduces the memory bandwidth required by the graphics processor, e.g. as explained above.

This in turn makes it possible to use a relatively smaller amount of memory space, which may enable a more effective caching of the geometry-related data locally to the graphics processor, whilst still maintaining throughput of geometry data. Thus, in some embodiments, the intermediate geometry data generated during the rendering of a particular region (or a certain number of regions that are being rendered in parallel) can be held entirely on chip. To facilitate this, the size of the regions that the render output is divided into for such sorting purposes and/or the size of the local storage (e.g. cache) is in an embodiment selected such that all of the expected intermediate geometry data required during the rendering of a particular region (or number of regions) can be held in local storage.

The approach according to the technology described herein wherein an initial coarse sorting of the geometry is performed using such higher level representation of the position of a set of geometry is therefore in contrast to a more traditional, e.g. tile-based, rendering system in which all of the geometry data for the entire render output is typically obtained in full and processed up-front during the initial processing pass when generating the primitive lists.

For instance, in a traditional, e.g. tile based, graphics processing pipeline, the graphics processor first transforms all the geometry (the vertices) and prepares tile lists based on the transformed geometry, and then, for each tile in turn, using the respective tile lists, rasterizes the geometry for the tile and renders (shades) the geometry accordingly. Thus, in a traditional, e.g. tile based, graphics processing pipeline, all of the geometry processing for the entire render output is thus, in effect, usually performed up-front, and it is thus usually only the rasterising and rendering that is deferred.

The present Applicants have recognised that there may be a number of inefficiencies in this traditional tile-based graphics processing operation.

Firstly, in order to do the tiling process the graphic processor must perform at least some of the geometry (vertex) shading transformations (e.g. for the vertex positions at least). This can involve relatively high memory bandwidth, in terms of fetching the relevant vertex data from memory to transform (shade) it, and then returning the transformed (shaded) vertices to memory (as the graphics processor will typically not have the capacity to retain all that data "on chip", as in modern tile-based graphics processing systems the intermediate geometry data is increasingly too large to be effectively cached locally to the graphics processor).

Thus, in traditional tile-based rendering systems the initial geometry processing in the first processing pass may generate a significant amount of intermediate geometry data that needs to be transferred to/from memory. This is in an embodiment avoided in the technology described herein, as the technology described herein can allow the amount of data that is generated to be reduced, therefore reducing the amount of memory space required to store the intermediate geometry data generated during the rendering (such that it can be more easily cached locally to the graphics processor), e.g., such that in the technology described herein it is potentially (and in an embodiment) only the hypertile lists generated during the initial sorting operation that need to be written back to memory.

Also, in traditional tile-based rendering systems the vertices (geometry) that is processed in the initial vertex shading stage are not spatially localised (i.e. could be from anywhere in the frame). It is only after the vertex shading and tiling has been done that the spatial distribution (and spatial locality) of the geometry and primitives for the frame is "discovered" (and constrained). Thus there is no opportunity for the initial vertex shading and tiling stage to exploit any spatial locality in the data.

Thus, while once the tiling processing has been done, the spatial locality of the geometry can be exploited, and smaller units of processing to allow the data to be kept on chip for the fragment shading, etc. can be done, in a traditional tile-based rendering system there is initially a large amount of processing that is performed in order to discover the spatial locality and which, correspondingly, requires and uses significant memory bandwidth.

Similar issues may also arise in the context of immediate mode renderers, for example in terms of there not being any guarantee or ability to ensure spatial locality between successive geometry and primitives being processed, such that again any spatial locality of the geometry cannot be exploited.

The technology described herein is able to address some of these inefficiencies, at least in its embodiments.

For instance, and as mentioned above, the initial higher level sorting of the geometry into the different regions of the render output in the technology described herein means that the spatial locality of the geometry is known at this stage (at least to the level of the regions into which the render output has been divided for the purposes of the initial sorting). The benefit of this is that, as described above, once the geometry has been sorted into such "hypertiles", then all the geometry in a hypertile will be spatially local (and so spatial locality can be exploited), and also the amount of data needing to be processed per hypertile should (ideally) be able to be kept locally on the chip until the hypertile is finished, thereby reducing memory bandwidth.

This also means that the geometry processing at the level of the primitives (e.g. the vertex shading, etc.) can be deferred, and it is in an embodiment only the initial, coarse sorting of the geometry that is performed up-front. Thus, in the technology described herein, it is possible to defer processing earlier in the graphics processing pipeline, e.g. compared to a more traditional tile-based rendering approach, since more of the geometry processing (and in an embodiment all of the geometry processing other than the higher level hypertiling operation) can be, in effect, deferred until a second or further processing pass.

Thus, in the technology described herein, rather than obtaining, and processing, the geometry for the render output in the usual fashion for a tile-based renderer, a higher level sorting of the initial sets of primitives is performed to first sort the sets of primitives into respective regions of the screen, and the rest of the processing including obtaining the geometry data, the vertex shading, etc., can be (and in an embodiment is) deferred at this point.

Thus, in embodiments, the graphics processor is configured to perform some initial "lightweight" and "cheap" spatial sorting of the geometry, into "hypertiles" (with each "hypertile" corresponding to a given area of the render output) (screen space) and (normally and in an embodiment) being bigger than the rendering tiles that the fragment shading operates on), and then feed the hypertiles (the lists of geometry for the hypertiles) into the graphics pipeline, with the graphics pipeline then doing the full geometry (vertex) shading (and any "rendering tile" tiling), and rendering on a per hypertile basis.

Furthermore, the initial sorting of the geometry into hypertiles is done in a relatively "cheap" and "lightweight" manner, so as to reduce the memory bandwidth, etc, cost of that stage of the process.

The overall effect therefore should be to reduce the memory bandwidth requirements when rendering and correspondingly facilitate retaining more of the data on the chip whilst doing the rendering, and being able to better exploit any spatial locality between the data.

Therefore, the technology described herein may provide various benefits compared to more traditional tile-based (or immediate mode) graphics processing systems.

The sets of geometry that are to be processed in the technology described herein may comprise any suitable and desired sets, or 'subsets' of geometry (e.g. that may be defined for graphics processing). The sets of geometry may, and embodiments do, comprise (or at least define or represent) a group of one or more, and in an embodiment plural, polygons (which are in an embodiment simple polygons such as triangles), with each polygon defined in terms of a respective set of (e.g. three) vertices. In some embodiments, a (and each) set of geometry may comprise a "mesh" of polygons, e.g., consisting of a connected group of polygons, e.g. with one or more vertices being shared by polygons in the group, or a suitable subdivision of such a "mesh" (e.g. a "meshlet"). As other examples the set of geometry may comprise a "strip" or "fan" of polygons (e.g. triangles). However, in general the sets of geometry that are processed in the technology described herein may comprise any suitable (grouping of) (lower level) units of geometry (such as lines, points, etc.) that may be specified by the application and that the graphics processor may operate on, as desired.

The lower level units of geometry (e.g. polygons) are in an embodiment arranged into such sets of geometry such that each unit of geometry (e.g. polygon) is included in exactly one such set of geometry. In an embodiment the partitioning of the geometry into such sets of geometry is performed offline, and upfront, to facilitate optimising the packing of the geometry into such sets of geometry. For example, and in an embodiment, all of the geometry in a set of geometry is relatively tightly spaced together, in an embodiment such that at least some of the units of geometry share one or more vertices and/or edges (such that the higher level representations are representations of a relatively tight cluster of geometry, thus facilitating an improved initial sorting operation).

As mentioned above, in the technology described herein, the initial sorting of the geometry into the regions of the render output (the "hypertiling" operation) considers sets of geometry as a whole (thus higher level representations of the position of the geometry compared to the individual vertex positions).

The higher level representation of the position of a set of geometry can take any suitable and desired form. It in an embodiment represents and indicates the overall spatial extent of the geometry in the set of geometry, and thus in an embodiment represents and indicates a "bounding" position, and in an embodiment a bounding area or volume, for the set of geometry. For example, in an embodiment, the higher level representation of the position of a set of geometry comprises a bounding box for the set of geometry (and that includes all of the geometry in the set of geometry).

Where the higher order position representation comprises a bounding box, the bounding box may comprise either a 2D or 3D bounding box, e.g. depending on the application (and geometry) in question. For example, a 2D bounding box may comprise a rectangle defined in terms of (min, max) (x, y) co-ordinates for the geometry in the set. Similarly, a 3D bounding box may comprise a cuboid or sphere defined in terms of (min, max) (x, y, z) co-ordinates (or some other suitable 3D co-ordinate system).

However, other suitable higher level representations of the position may also be used.

It will be appreciated that the higher level position representation, e.g. bounding box, therefore does not necessarily represent the positions of the individual geometry in the set of geometry, since the higher level position representation, e.g. bounding box, will typically cover a larger area than is covered by the actual geometry. This of course means that the initial sorting using the higher level representation of the position of the set of geometry, e.g. the bounding box, may result in it being determined that a given set of geometry should be processed for a particular region of the render output when the set of geometry does not in fact need to be rendered for that render output region. However, this can easily be resolved, e.g., during the second processing pass, and so this is generally acceptable since in the technology described herein the initial sorting is in an embodiment a relatively quick and coarse sorting.

For example, where the set of geometry includes a group of polygons (e.g. defined in terms of a "mesh", or "meshlet", etc.), the higher level representation of the position of the set of geometry may represent the position, e.g., the overall spatial extent, of the group of polygons as a whole, i.e. without specifying the positions of the individual polygons in the group. Thus, as mentioned above, the initial sorting is performed at a higher level, and is hence relatively 'coarser', than the subsequent processing of the geometry using the vertices (i.e. using the associated geometry data). In this respect, it will be appreciated that the regions of the render output into which the sets of geometry are initially sorted in the technology described herein (which will be referred to herein as "hypertiles", with the initial sorting correspondingly comprising a "hypertiling" operation) are also in an embodiment larger than the typical sizes of, for example, the rendering tiles in a more traditional tile-based rendering system. For instance, the regions of the render output may correspond to a 256×256 array of render output (frame buffer) pixels.

To perform the initial sorting operation of the technology described herein, the graphics processor thus obtains for each set of geometry to be processed the higher level representation of the position of the set of geometry, and it is this higher level representation of the position of the set of geometry that is used during the initial sorting (and in an embodiment it is only this higher level representation of the position of the set of geometry that is used for the initial sorting, in particular such that the initial sorting is performed without reading in the individual vertices themselves).

The higher level representation of the position of the set of geometry is provided to, and can thus be (and is) obtained by the graphics processor separately to, and independently of, the (lower level) geometry data (e.g. representing the individual vertices) for the set of geometry.

The higher level representation of the positions for the sets of geometry can be provided in any suitable and desired manner.

In one embodiment, the higher level representations of the positions of the sets of geometry are specified (and provided) by the application that requires the graphics processing, e.g., and in an embodiment, by being specified for the application by the application programmer, such that the higher level representations are in an embodiment part of the application's content (i.e. are "assets" of the application).

For instance, the higher level representation for a set of geometry may be specified as an asset for the application by the application programmer, and may thus be generated in advance (in an embodiment offline), e.g. during the initial configuration of the application. During run-time of the application, the higher level representations of the positions of the sets of geometry are thus in an embodiment provided by the application itself. Having the higher level representations prepared offline may be beneficial, at least where the geometry is relatively static, since this allows the arrangement of geometry into given sets of geometry to be optimised, e.g. such that the individual lower level "units" of geometry in the sets of geometry are relatively close together, and in an embodiment share vertices and/or edges.

The application may be any suitable and desired application that requires graphics processing. For example, as mentioned above, the application that requires the graphics processing, and that in an embodiment specifies the higher level representations of the positions of the sets of geometry, may be an end application such as a game. However, the application (that in an embodiment specifies the higher level representations of the positions of the sets of geometry) could also be, e.g., a game engine for a game, or an operating system, e.g. executing a GUI.

Various other arrangements would also or instead be possible for providing the higher level representations for the sets of geometry.

For example, rather than the higher level representations being prepared for the application offline, the application could instead generate the higher level representations when the application is loaded. Or, in some cases, the higher level representations could be generated during application runtime.

It would also be possible for the higher level representations to be prepared, e.g., by the driver for the graphics processor, rather than the application itself.

The higher level representations of the positions of the sets of geometry may be stored in any suitable and desired manner, e.g., such that they can be suitably obtained by the graphics processor separately to the geometry data. For example, the higher level representations of the positions of the sets of geometry are in an embodiment stored in memory, in an embodiment in a portion of external, e.g., main, memory, in an embodiment at the same level of the memory system as the geometry data itself, but stored in a separate manner. For example, the higher level representation of the position of a set of geometry may be stored and provided as separate metadata associated with the geometry data.

During execution of the application, during the initial sorting operation, for each set of geometry that is to be sorted, the graphics processor thus in an embodiment obtains the associated higher level representation of the set of geometry from memory, and then processes it accordingly. For example, in embodiments, the API is modified to include an instruction to provide the higher level representation to the graphics processor. The higher level representation can then be fetched from its location in memory and read into the graphics processor for the initial sorting operation.

The higher level representation of the position (e.g. bounding box) for a given set of geometry is in an embodiment provided to the graphics processor as a model space representation of the position. For example, the higher level representation is in an embodiment generated in model space (e.g., and in an embodiment, the same space as the vertices are specified in) so that the higher level representations are view-independent. In order to perform the initial sorting the higher level representation of the position (bounding box) for the set of geometry is therefore in an embodiment first converted into a screen space representation of the position for the set of geometry. To do this, the representation of the position (bounding box) for the set of geometry is in an embodiment first subject at the graphics processor to an appropriate transformation to screen space (before the initial sorting operation is performed).

Thus, in embodiments, the representation of the position (e.g. bounding box) for a given set of geometry is obtained by the graphics processor as a world or model space representation of the position, with the graphics processor then acting to transform that position representation as provided by the application to the screen space (to the 2D render output space).

The bounding box transformations for the sets of geometry are in an embodiment performed by means of executing an appropriate "shader" (shading operation) on the graphics processor. Thus the, e.g., application will submit (e.g. untransformed world or model space) bounding boxes (which have in an embodiment being prepared offline, e.g. as part of the assets for the application, e.g. as described above) for corresponding sets of geometry, and the graphics processor will then execute a shader that transforms the bounding boxes to the screen space and emits appropriate screen space transformed bounding box positions together with an identifier that indicates the set of geometry that the bounding box corresponds to. In an embodiment this transformation is performed for each new render output (e.g. for each frame), or at least for each new viewpoint.

This significantly reduces the initial geometry processing that needs to be done on the graphics processor to do the initial geometry sorting (e.g. since it is only the co-ordinates of the bounding box that need to be converted to screen space, e.g. only four or eight co-ordinates depending on whether the bounding box that is provided in the initial model space is a 2D or 3D bounding box), and in particular, for example, reduces significantly the position data that needs to be fetched from memory for the initial geometry sorting process (thereby significantly reducing memory bandwidth for the tiling operation), as compared, for example, to more traditional tiling systems that use the vertices of the primitives themselves to generate the screen space bounding boxes.

There is then in an embodiment an appropriate sorting ("hypertiling") circuit that takes the output of the shader and sorts the sets of geometry (more particularly, sorts the bounding boxes) into the different regions of the render output into which the render output has been divided (the "hypertiles").

However, other arrangements would be possible. For example, the bounding box transformation may be performed as a separate compute workload on the graphics processor. Or, in some cases, the bounding box transformation could be performed, e.g., on another, e.g., a host processor (CPU) with the graphics processor then being provided with the transformed screen space representation, e.g. bounding box.

(It would also be possible for the application itself to specify a transformed screen space representation, e.g. bounding box, in which case the initial shading operation may be omitted, and the representation, e.g. bounding box, can be provided directly to the sorting ("hypertiling") circuit.)

In embodiments, the method comprises a step of (the graphics processor) dividing the render output into a plurality of regions for the initial geometry sorting, each region comprising an area of the render output. In an embodiment, the render output is divided into a plurality of uniformly sized, e.g. rectangular (e.g. square), regions. However, other arrangements would of course be possible. The regions may generally have any size, as desired. For example, in some embodiments, each region may correspond to a 256×256 array of render output (frame buffer) pixels (and so it will be appreciated that the regions may be larger than the typical rendering tile sizes used for tile-based graphics processing (and hence larger than the rendering tile sizes used in embodiments of the technology described herein where the rendering is performed in a tile-based fashion). However, this need not be the case.

It would also be possible for the regions into which the render output is divided to be constrained by depth, such that the initial sorting of the geometry into such regions not only sorts the geometry into different areas of the render output but also sorts the geometry by depth.

As mentioned above, in an embodiment, the size of the regions ("hypertiles") are selected such that it is expected that all of the geometry data for a region (or for a certain number of regions that may be processed in parallel) can be stored locally to the graphics processor. In this way, as has been explained already above, the technology described herein can in an embodiment reduce instances of having to write intermediate geometry data to memory. However, this need not be the case. Further, the technology described herein can be used in conjunction with any suitable memory system, and it is not necessary to store any of the data locally (although this is done in embodiments).

The determination of which sets of geometry should be processed for which regions of the render output (i.e. the tiling part of the "hypertiling" operation) could operate in a similar fashion to a more traditional tiling operation, i.e. by adding the set of geometry to a (hypertile) list for all hypertiles that the screen space bounding box for the set of geometry overlaps (at least in part).

For example, this may be done by determining the intersections of the representation of the position of the set of geometry, e.g. the bounding box, with the regions of the render output (in a similar manner as would be done in a more traditional tile-based rendering approach when binning the primitives into their respective regions for rendering, but using the higher level representations of the position of the set of geometry (e.g., and in an embodiment, as specified by the application), e.g. rather than using a bounding box generated by the graphics processor from vertex positions for the individual geometry units themselves).

Thus, once the higher order representation of the geometry, e.g. bounding box, has been obtained for a set of geometry, it is then determined for which region(s) of the render output the set geometry should be processed for. This is in an embodiment done by checking which of the regions of the render output are at least partially covered by the higher order position representation in question.

(Again it will be appreciated that the set of geometry may not actually need to be rendered for all regions that are intersected by the higher order representation, as this is only a coarse representation of the spatial extent. However, this will be resolved during the subsequent geometry processing, e.g. in the second or further processing pass, e.g. by culling the geometry appropriately.)

Thus, in embodiments, the determination of which sets of geometry should be processed for which regions of the render output comprises, for each set of geometry to be processed: determining from the representation of the position of the set of geometry (e.g. the bounding box) which regions of the render output are at least partially covered by the representation (bounding box), and indicating that the set of geometry should therefore be processed for those regions, e.g., and in an embodiment, by adding the set of geometry to a corresponding list or lists for those regions. Other arrangements would be possible.

While doing the initial geometry sorting (hypertiling), the graphics processor can also perform any other optimisations, such as culling, that could be possible based on the higher level position representations, e.g. bounding boxes (and any associated properties thereof). For example, any position representations, e.g. bounding boxes (and thus sets of geometry) that are determined to fall completely outside the view frustum could simply be culled (not added to a list for a region of the render output) (and thus in embodiments the method further comprises the graphics processor culling any sets of geometry whose higher level representation of the position falls outside of a desired view frustum).

It would also be possible to perform other forms of culling, such as backface culling, where the information provided for the higher level position representations, e.g. bounding boxes, and the corresponding sets of geometry that they represent facilitates that.

Also, where, for example, the position representations of the sets of geometry comprise depth information (e.g. are in the form of 3D bounding boxes (volumes), with an implicit depth value, e.g. it's mid-point), then that depth information could be used, where appropriate, to also sort the sets of geometry within the regions (hypertiles), e.g. into a desired depth-based order (e.g. so as to list the sets of geometry in the hypertile lists in depth order). Thus, in embodiments, the higher level representation of the position of the set of geometry includes a depth value, and the method comprises including the sets of geometry into the list(s) in depth order.

This could be done based on whether the sets of geometry are indicated as being opaque or transparent, as appropriate (e.g. whether blending is enabled or not enabled). This information may be determined as desired, e.g. from the draw call descriptor that is associated with the higher level position representations, e.g. bounding boxes. Thus the initial hypertiling process could perform depth sorting where the position data includes depth information. Performing the depth sorting during the initial hypertiling process may require keeping track of all of the hypertile lists.

Thus, alternatively, and in some embodiments, the depth sorting may be performed opportunistically during the deferred processing pass. This means that the depth sorting is performed only for the hypertiles that are currently being processed in parallel.

Such depth sorting can help (e.g.) to optimise hidden surface removal during the subsequent graphics processing operations. For example, the graphics processor may perform some form of hierarchical depth testing in the rasteriser and/or an early depth test before fragment shading. To optimise the performance of these steps it is beneficial for at least the opaque geometry to be sorted from front to back as this allows the hierarchical depth testing to kill most of the occluded fragments.

The depth sorting could also be performed by the application providing the geometry in depth order. However, for modern graphics processing tasks the large number of drawcalls and potential complexity of the geometry means that it is normally more efficient for the depth sorting to be performed opportunistically by the graphics processor.

The result of the initial sorting is therefore to generate one or more ("hypertile") lists indicating which sets of geometry are to be processed for which regions of the render output (hypertiles). In some embodiments, each region has its own respective list. However, it would also be possible to generate a list for a group of plural regions. For example, the hypertiling operation may be performed in a "hierarchical" manner.

It will be appreciated that a set of geometry may fall in multiple regions and so may need to be processed for multiple regions of the render output. That is, a set of geometry may fall into more than one region of the render output. In that case, the set of geometry may be included in a respective list for each region in which it is determined the set of geometry should be processed for.

In some embodiments each and every set of geometry that is received to be processed is processed in the same manner described above and sorted into a respective one or more ("hypertile") list. However, it would also be possible to use other arrangements, and it is contemplated that less than all of the sets of geometry may be processed in this manner. For instance, in some cases it may be desirable for the graphics processor to also be able to sort at least some of the geometry in a different manner, e.g. in a more traditional tile-based manner.

Thus, in some embodiments, the graphics processor is operable to perform different sorting operations, e.g. for different sets of geometry. In such embodiments, when a new set of geometry is received to be processed, the method may further comprise first checking whether or not the set of geometry should be processed in the manner described above (e.g. by performing the "hypertiling" operation, and if so, proceeding to do so).

Various options would be possible in this regard. For example, in a tile-based graphics processor at least, sets of geometry could be added to such hypertile lists in the case where the position representation, e.g. bounding box, for the set of geometry falls entirely within a single hypertile/sorting region of the render output, but in the case where the bounding box for a set of geometry falls into more than one hypertile/sorting region of the render output, then for that set of geometry a conventional tiling process could be performed instead, where the positions for the actual vertices of the geometry in question are fetched by the graphics processor, transformed to screen space, and then the geometry in the set of geometry is sorted into tile lists for the "rendering tiles" (as opposed to the hypertiles).

In this case therefore there may be two sets of "tile lists" generated as part of the hypertiling operation, one set listing sets of geometry for hypertiles, and another set listing (e.g.) primitives for rendering tiles. Then, when rendering takes place, both the hypertile lists and the rendering tile lists will need to be considered appropriately.

As a result of the initial sorting (in whichever manner it is performed), it is thus determined which sets of geometry are to be processed for which regions of the render output, and one or more lists are thereby generated indicating the same.

For instance, whilst various embodiments have been described with reference to the processing of a single set of geometry, it will be appreciated that these steps will typically be repeated for a plurality of sets of geometry that are to be processed for the render output. When a new set of geometry is received to be processed, this is in an embodiment then processed in the same manner described above, e.g. and added to the relevant respective list or lists.

Once all sets of primitives have been processed in this way, such that the geometry has been sorted into the different regions of the render output, and the one or more lists generated accordingly, the initial processing pass is finished. Each sorting region (hypertile) can then be rendered separately (e.g. in parallel), e.g. in a second or further processing pass.

Thus, once the hypertile lists (and any rendering tile lists) have been prepared, then the individual hypertiles can be processed to generate the render output. For example, once the hypertile lists (and any rendering tile lists) have been prepared, the graphics processor may then be caused to render a first one or more of the hypertiles (and then once the one or more hypertiles are rendered, then proceed to render another one or more hypertiles, and so on, until all of the hypertiles have been rendered). In an embodiment the graphics processing system comprises a plurality of graphics processing cores (or graphics processors) and a corresponding plurality of hypertiles are sent to be rendered in parallel.

The rendering of each different region can then be (and is) performed, e.g. in a second or further processing pass, with reference to the respective list (or lists) for that region. For instance, for a particular region of the render output that is to be rendered, the graphics processor is able to read the respective list(s) indicating which sets of geometry should be processed for that region, to thereby determine which sets of geometry should be processed for the region, and to then process the indicated sets of geometry for the region accordingly, e.g., and in an embodiment, by obtaining the associated lower level geometry data for the sets of geometry indicated for the region, and then processing the geometry, e.g., in the manner described above (including, e.g., performing the vertex shading and any other desired geometry processing operations, etc., before proceeding to rasterise/render the geometry), to generate the render output.

Thus, the rendering of the different regions, e.g. in the second or further processing pass, is performed using the associated lower level geometry data in particular the individual vertices and their attributes. The rendering is hence performed at the level of the individual units of geometry using the associated vertex data, such as at the level of individual polygons, etc.

Thus, the rendering of a set of geometry in the technology described herein in an embodiment comprises a step of the graphics processor obtaining the associated lower level geometry data (e.g. vertex indices and attributes) that is to be used for rendering the set of geometry. The obtained geometry data (for the vertices) is in an embodiment then processed, e.g., including any desired geometry processing operations (such as vertex shading, etc., operations) to convert the geometry data into a format suitable for the subsequent graphics processing operations to be performed by the graphics processor, such as the rasterising of the geometry into fragments and the subsequent shading of the fragments, etc., to generate the render output.

That is, once the lower level geometry data has been obtained, and after any desired geometry processing has been performed, the graphics processor proceeds with processing the geometry in order to generate the render output, and in particular, the generation of the render output may (and in an embodiment does) involve the graphics processor rasterising the geometry into respective sets of graphics fragments for rendering, which graphics fragments are then rendered (e.g. shaded) accordingly.

Thus, the processing for an (and each) individual hypertile in an embodiment involves firstly loading the vertex positions for the geometry within the hypertile and appropriately transforming that geometry, doing the vertex shading, etc., to provide transformed and vertex shaded geometry for processing for the hypertile. In embodiments, the graphics processor is arranged such that all of this can be done on-chip (i.e. such that the hypertiles are of such a size that it might be expected that all the geometry processing, etc., for a given hypertile can be done on-chip, without the need to send any data out to external memory (although the technology described herein is still applicable to and useful in situations where some data does need to be sent out to external memory)).

Once the hypertile geometry processing has been done, then the rest of the rendering can take place (and as discussed above, this is in an embodiment done while retaining all the data for the hypertile on-chip).

The graphics processor should, and in an embodiment does, use the associated geometry data including the vertex data for rendering the sets of geometry, e.g. in the usual manner.

Any suitable rendering scheme may be used, as desired. For instance, the rendering of a hypertile could be done using immediate mode rendering or tile-based rendering.

In the case of immediate mode rendering, the processor would simply take each hypertile in turn and do immediate mode rendering to render the hypertile. This is still advantageous, because the initial sort into hypertiles should then ensure better spatial locality for the immediate mode rendering process.

In the case of tile-based rendering using the hypertiles, then in the typical situation where the rendering tiles are smaller than the hypertiles into which the geometry was initially sorted, the first stage in the process once the hypertile geometry has been properly transformed and vertex shaded, etc., is in an embodiment to then prepare and store (in an embodiment on-chip) tile lists for the individual rendering tiles, with each individual rendering tile then being rendered in turn using the rendering tile lists in the normal manner.

Thus, in embodiments, the rendering of the sets of geometry for the regions of the render output is performed using tile-based rendering, wherein each of the regions that the render output was divided into for sorting is subdivided into a plurality of rendering tiles, each rendering tile representing a sub-area of the render output region, and the rendering of a region comprises a step of preparing a set of one or more tile list(s) indicating which of the sets of geometry that have been indicated to be processed for the region should be processed for which of the rendering tiles.

Thus in this case, there will potentially be two "tiling" operations, the first to prepare the hypertile lists, and then for each hypertile (separately), a separate tiling process to prepare rendering tile lists for the rendering tiles within the hypertile.

The rendering operation can then be performed in any suitable and desired fashion. For instance, in some embodiments, the rendering that is performed comprises a rasterization-based rendering scheme, e.g. as described above. In that case, the rasterization, fragment shading, etc., processes can then be performed in the normal manner for each rendering tile, e.g. in turn. However, in other embodiments, the rendering that is performed may comprise ray tracing, hybrid ray tracing, or any other suitable rendering techniques, as desired, in which case the processing (rendering) of the sets of geometry may be performed accordingly.

It would also be possible, for example, for the graphics processor to determine which of a plurality of available rendering modes to use based on the initial hypertiling operation, and in some embodiments this is done. For example, if the initial hypertiling operation determines that the geometry for a particular hypertile to be rendered is relatively simple, the graphics processor may, e.g., perform immediate mode rendering rather than tile-based rendering. In that case, the second tiling operation may be avoided. Various arrangements would be possible in this regard.

Another advantage of the hypertiling operation according to the technology described herein is that it enhances the possibility of parallelisation of the rendering process. For example, because the spatial distribution of the geometry is determined during the initial coarse sorting, individual hypertiles can be distributed over multiple graphics processors (or processing cores) to be rendered in parallel.

Also, in the case of so-called foveated rendering, e.g. for VR purposes, where different regions of the render output may need to generated at different qualities, the individual hypertiles that are required to be rendered for the foveal regions can be identified and rendered to thereby facilitate more efficient foveated rendering, rather than, e.g., having to fully transform and process all the geometry first to then work out which geometry needs to be processed for the foveal regions.

Thus, it will be appreciated that technology described herein provides various benefits compared to existing approaches.

The technology described herein also extends to the operation of the graphics processor itself.

A further embodiment of the technology described herein comprises a method of operating a graphics processor to process sets of geometry for an application in order to generate a render output for the application, the method comprising:
when processing plural sets of geometry for a render output, wherein each set of geometry is associated with respective lower level geometry data that is to be used when rendering the set of geometry, the associated lower level geometry data for a set of geometry including vertex data representing a set of vertices for the geometry in the set of geometry, and wherein each set of geometry is further associated with a "higher level" representation of the position of the set of geometry, the higher level representation of the position of the set of geometry being separate and in addition to the associated lower level geometry data for the set of geometry and being obtainable by the graphics processor independently of the associated lower level geometry data:
for each set of geometry to be processed:
the graphics processor obtaining the higher level representation of the position of the set of geometry; and
the graphics processor determining, using the higher level representation of the position of the set of geometry, which region or regions of a plurality of regions ("hypertiles") into which the render output has been divided, the set of geometry should be processed for, wherein each region comprises a respective area of the render output;
the graphics processor thereby generating one or more ("hypertile") lists indicating which sets of geometry should be processed for which regions of the render output;
the method further comprising:
after the one or more ("hypertile") lists indicating which sets of geometry should be processed for which regions of the render output have been generated:
for a region of the render output to be rendered:
determining using the respective ("hypertile") list(s) for the region of the render output which sets of geometry should be processed for the region of the render output;
obtaining the associated lower level geometry data for each of the sets of geometry that are indicated to be processed for the region, the obtained lower level geometry data including the vertex data representing the vertices for the geometry in the sets of geometry that are indicated to be processed for the region; and
processing the obtained lower level geometry data to generate a render output.

Another embodiment of the technology described herein comprises a graphics processor operable to process sets of geometry for an application in order to generate a render output for the application, the graphics processor including:
a sorting circuit that is configured to:
when processing plural sets of geometry for a render output, wherein each set of geometry is associated with respective lower level geometry data that is to be used when rendering the set of geometry, the associated lower level geometry data for a set of geometry including vertex data representing a set of vertices for the geometry in the set of geometry, and wherein each set of geometry is further associated with a "higher level" representation of the position of the set of geometry, the higher level representation of the position of the set of geometry being separate and in addition to the associated lower level geometry data for the set of geometry and being obtainable by the graphics processor independently of the associated lower level geometry data:
for each set of geometry to be processed:
cause the graphics processor to obtain the higher level representation of the position of the set of geometry;
determine, using the higher level representation of the position of the set of geometry, which region or regions of a plurality of regions ("hypertiles") into which the render output has been divided the set of geometry should be processed for, wherein each region comprises a respective area of the render output; and
thereby generate one or more ("hypertile") lists indicating which sets of geometry should be processed for which regions of the render output;
the graphics processor further including a rendering circuit that is configured to render regions of the render output by:
for each region to be rendered:
the rendering circuit determining using the respective ("hypertile") list(s) for the region of the render output which sets of geometry should be processed for the region of the render output;
the rendering circuit obtaining the associated lower level geometry data for each of the sets of geometry that are indicated to be processed for the region, the obtained lower level geometry data including the vertex data representing the vertices for the geometry in the sets of geometry that are indicated to be processed for the region; and
the rendering circuit processing the obtained lower level geometry data to generate a render output.

The graphics processor (and method of graphics processing) according to these embodiments may form part of a graphics processing system including one or more host processor operable to execute an application, wherein the graphics processor is operable to process sets of geometry for the application executing on the one or more host processor, e.g. in the manner described above. Thus, the graphics processor in these embodiments may (and in an embodiment does) include any and all of the features described above, at least to the extent they are not mutually incompatible.

The render output that is generated according to the technology described herein may, for example, comprise (at least a part of) a frame for display. For instance, the render output may comprise a (full) frame, or some other desired rendering unit, e.g. a draw call, for the frame. However, in general, the technology described herein can be used for all forms of output that a graphics processor may be used to generate, such as frames for display, render-to-texture outputs, etc.

The graphics processor in an embodiment executes a graphics processing pipeline that can contain any suitable and desired processing stages, etc. that a graphics processing pipeline may normally include.

In some embodiments, the graphics processor comprises, and/or is in communication with, one or more memories and/or memory devices that store the data described herein, such as the primitive (geometry and state) data, etc., and/or store software for performing the processes described herein. The graphics processing pipeline may also be in communication with a host microprocessor, and/or with a display for displaying images based on the data generated by the graphics processor.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, the various functional elements, stages, pipelines and "means" of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described aspects and embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising data processing means causes in conjunction with said data processing means said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Various embodiments will now be described, by way of example only, and with reference to the accompanying drawings.

FIG. 1 shows an exemplary graphics processing system in which the technology described herein and the present embodiments may be implemented.

The exemplary graphics processing system shown in FIG. 1 comprises a host processor comprising a central processing unit (CPU) 1, a graphics processor (graphics processing unit (GPU)) 10, a video codec 2, a display controller 3, and a memory controller 4. As shown in FIG. 1, these units communicate via an interconnect 5 and have access to an off-chip memory system (memory) 6. In this system, the GPU 10, the video codec 2 and/or CPU 1 will generate frames (images) to be displayed and the display controller 3 will then provide frames to a display 7 for display.

In use of this system, an application 8, such as a game, executing on the host processor (CPU) 1 will, for example, require the display of frames on the display 7. To do this the application 8 will send appropriate commands and data to a driver 9 for the graphics processing unit 10 that is executing on the CPU 1. The driver 9 will then generate appropriate commands and data to cause the graphics processing unit 10 to render appropriate frames for display and store those frames in appropriate frame buffers, e.g. in main memory 6. The display controller 3 will then read those frames into a buffer for the display from where they are then read out and displayed on the display panel of the display 7.

Various embodiments of the technology described herein will be described with reference to FIGS. 4 to 11.

However, by way of comparison, a more traditional tile-based rendering system will first be described with reference to FIGS. 2 and 3.

In a traditional tile-based rendering system the render output is divided into a plurality of tiles for rendering. The tiles are then rendered separately to generate the render output (which may be, e.g., (at least a part of) a frame for display, a render-to-texture output, or any other suitable and desired render output). To do this, for each draw call that is received to be processed (which draw call may, e.g., be a draw call for a single frame, or at least part of a frame), it is first necessary to sort the polygons for the draw call according to which tiles they should be processed for.

Figure 2:
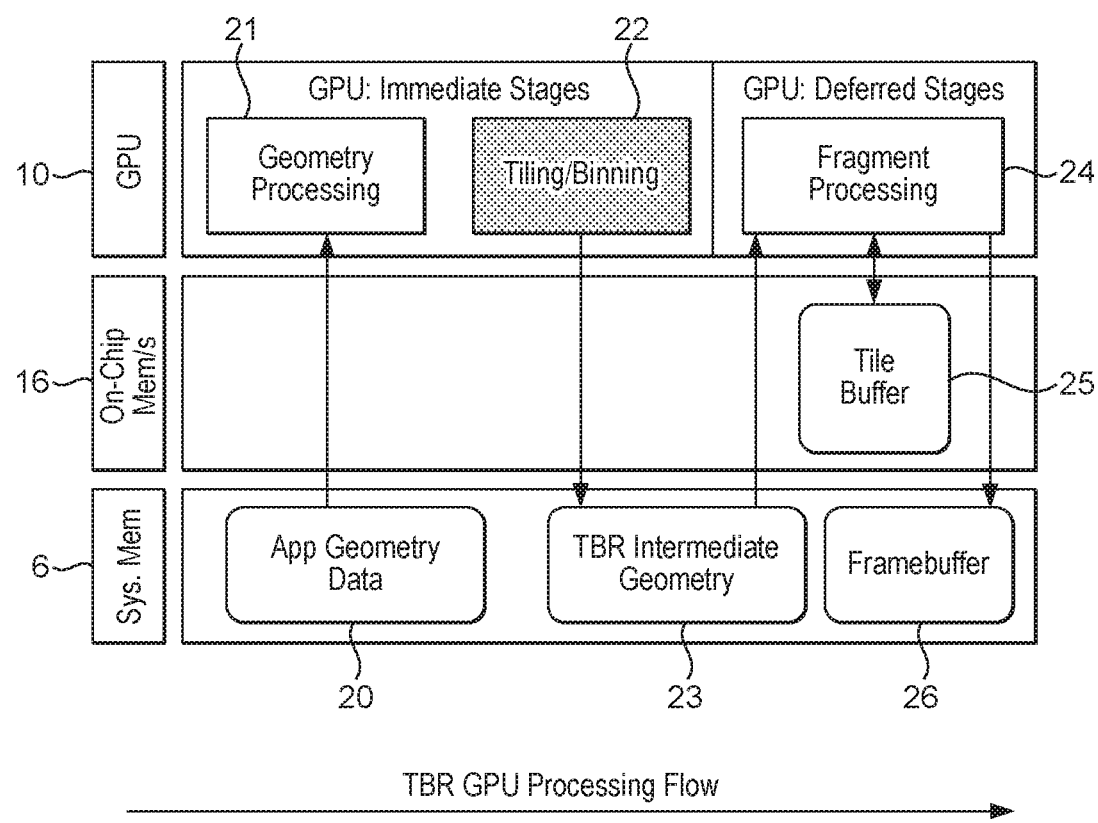
FIGS. 2 and 3 schematically illustrate the operation of a traditional tile-based graphics processing system.

Thus, as shown in FIG. 2, in a first processing pass, all of the required geometry data 20 for the draw call is read from the external memory system 6 into the graphics processor (graphics processing unit) 10. The polygon vertices are thus obtained and the usual geometry processing 21 (e.g. vertex shading) is performed for all of the polygons in order to generate a corresponding set of post-transformed geometry data (e.g. transformed vertices) 23.

The transformed geometry is then subject to a tiling operation 22 on the graphics processor 10 wherein it is determined for each of the polygons which rendering tiles the polygons should be processed for. In this way the graphics processor 10 is operated to generate respective polygon lists (or tile lists) indicating which polygons are to be rendered for which of the rendering tiles.

Once all of the geometry processing for the render output has completed, and the tiling operating has completed, the transformed geometry 23 is then written back to the external memory system 6 together with the tile lists, and the first processing pass is complete.

A second processing pass is then performed wherein each of the rendering tiles is rendered (separately) in turn. Thus, for each rendering tile, it is determined from the respective tile list(s) which polygons should be processed for that tile, and the associated transformed geometry data 23 for those polygons is read back in from memory and subject to further graphics processing 24 to generate the render output.

As shown in FIG. 2, the rendering is performed using a tile buffer 25 that resides in on-chip memory 16. Thus, the rendering of a given tile is performed locally to the graphics processor. Once the rendering for the tile has complete, the rendered data is then written out to the external memory 6, e.g. into a frame buffer 26, e.g. for display.

In the tile-based rendering scheme described above, the subsequent graphics processing 24 is performed by using the polygon lists generated in the first processing pass to determine which polygons should be processed and then rendering these polygons appropriately.

In order to be able to know which polygons should be processed for which tiles it is therefore required to perform the geometry processing 21 up front for all of the primitives that are to be processed for the entire draw call (e.g. frame). Thus, in the traditional tile-based graphics processing operation described above all of the geometry processing for the draw call is performed in one go during an initial processing pass. This is shown, for example, in FIG. 3.

Figure 3:
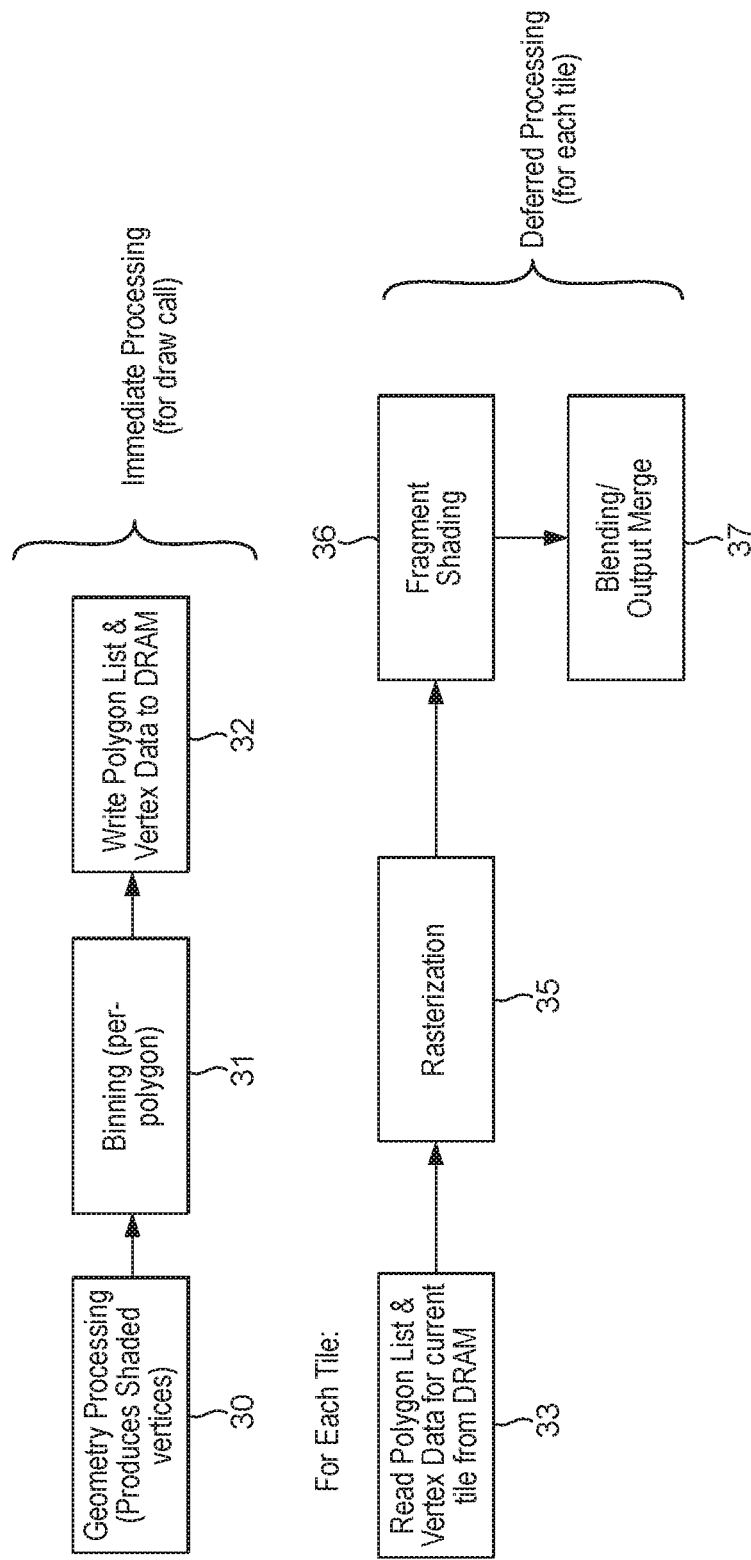

As shown in FIG. 3, in the first ("immediate") processing pass, all of the geometry-related processing for the draw call is performed (step 30), to produce a set of shaded vertices for the primitives in the draw call, and a tiling operation (step 31) is then performed for the polygons to generate the tile lists, which are then written back to the external memory, together with the shaded vertex data (step 32).

This data is then used in a second ("deferred") processing pass during which the render output is generated by rasterising/rendering the polygons using their associated geometry. Thus, as shown in FIG. 3, the second processing pass involves reading in the polygon list and vertex data for the current tile (step 33), and then performing the desired fragment processing.

For instance, following the tiling operations, in the second processing pass, the shaded vertices for the polygons indicated to be processed for the current tile are rasterised into respective sets of fragments (step 35), and a fragment shading operation is then performed on the fragments (step 36). Finally, the shaded fragments are subject to a blending operation (step 37), and any other such operations (such as downsampling, etc.) and the blended fragment values are then written into a suitable frame buffer, e.g. for display.

For modern graphics processors, the geometry data for the render output can be relatively large such that it cannot be effectively cached in local storage associated with the graphics processor. The intermediate geometry data generated from the first processing pass (the transformed vertices, etc.) is therefore typically written back to main (system) memory, or at least to a relatively larger cache in the memory hierarchy.

Thus, in the tile-based rendering scheme described above there is a significant memory bandwidth cost associated with transferring the geometry data to/from the external memory system 6.

In the present embodiment in contrast the processing is, in effect, "deferred" at an earlier position in the processing pipeline, before obtaining and processing the vertices, so that all of the geometry-related processing using the vertices is also deferred to a later processing pass.

This is achieved by performing an initial relatively coarser sorting of the geometry, using a "higher level" representation of the position of a set of geometry to be processed (which set of geometry in the present embodiment may comprise a "meshlet" in the form of a group of plural, connected polygons) that has been provided to the graphics processor (and is in an embodiment specified by the application) separately and in addition to the geometry data itself.

In the present embodiment the higher level representation of the position of the set of geometry is in the form of a bounding box (which may be a 2D or 3D bounding box, depending on the application and geometry in question). Further, the render output is divided into a number of relatively larger, e.g. 256×256, "hypertiles". These hypertiles are thus larger than the rendering tiles discussed above.

Figure 4:
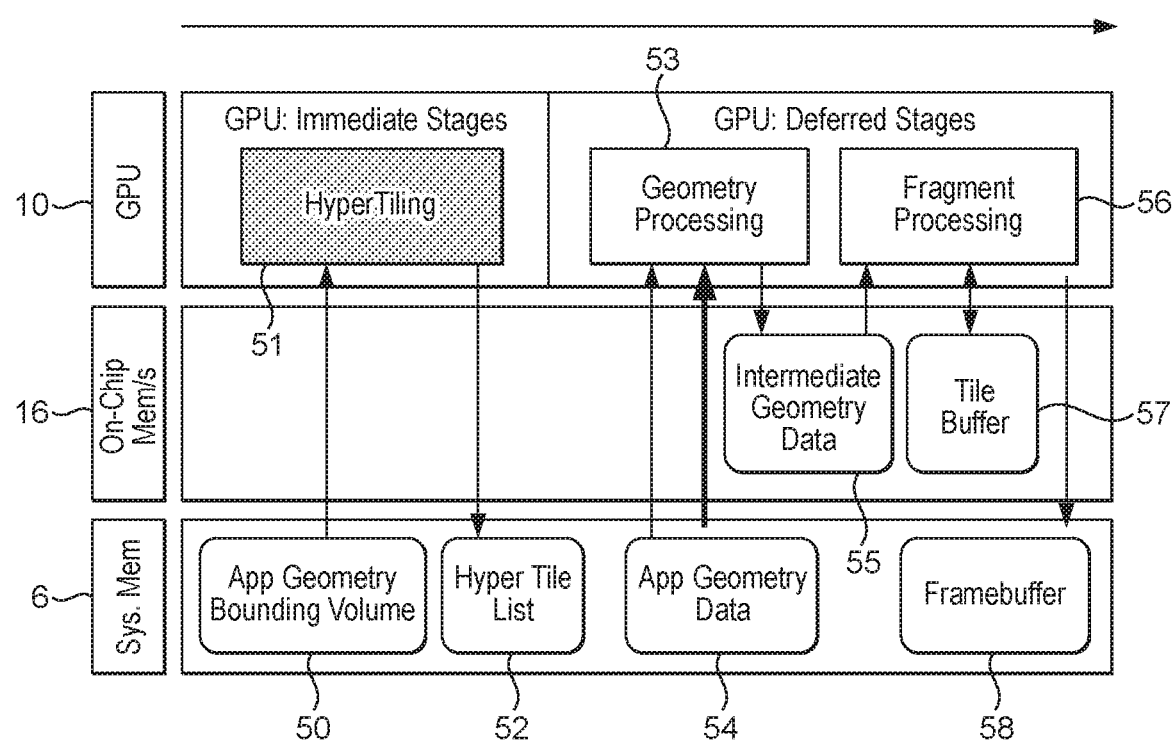
FIG. 4 illustrates schematically the operation of a graphics processing system according to an embodiment.

To facilitate this operation, the API is modified to provide such "higher level" representation of the position of a set of geometry to be processed. FIG. 4 shows the operation of a graphics processing system according to an embodiment.

In the first processing pass, the bounding box representations of the geometry 50 are read from their location in memory 6 into the graphics processor 10, and an initial sorting ("hypertiling") operation 51 is then performed to sort the geometry into respective hypertile lists indicating which geometry should be processed for which hypertiles. The hypertile lists 52 are then written back out to external memory 6.

In contrast to the tile-based rendering scheme discussed above, in the present embodiment the initial sorting is thus performed using only the bounding box representations of the geometry 50. Thus, there is no need at this stage to read in the geometry data 54.

Instead, once the hypertile lists 52 have been generated, a second processing pass is performed wherein each hypertile can be rendered (separately, and in an embodiment in parallel). To do this, the graphics processor identifies from the respective hypertile lists 52 which geometry should be processed for a given hypertile, and the required geometry 54 is then read into the graphics processor 10 from the external memory 6.

The geometry processing 53 (including the vertex shading, finer tiling of the geometry into respective rendering tiles into which the hypertile is divided for rendering, etc.) is then performed at this stage, and so is, in effect, "deferred" to the second processing pass.

In this way the amount of intermediate geometry data (e.g. the transformed vertices) that is generated instantaneously can be reduced, since only the geometry data for the hypertile (or hypertiles) that are currently being processed needs to be obtained and stored. This means that the intermediate geometry data 55, as well as the tile lists generated from the finer binning of the geometry into rendering tiles can in the present embodiment be stored entirely in on-chip memory 16 (and the size of the hypertiles may be selected to ensure this is the case, e.g. based on the size of the on-chip memory 16). Various arrangements would be possible in this regard. For instance, an on-chip first-in-first-out policy could be used to ensure that data is never written back to memory, or the data could be opportunistically cached.

The rendering of the hypertiles can then proceed, e.g. in the same manner described above. For instance, when the rendering is performed in a tile-based manner, the intermediate geometry data 55, including the tile lists, can then be read into the graphics processor 10 and the fragment processing 56 then performed using the tile buffer 57 in a similar fashion as described above, e.g. with the rendered data then being written into a suitable frame buffer 58 in external memory 6, e.g. for subsequent display.

Figure 5:
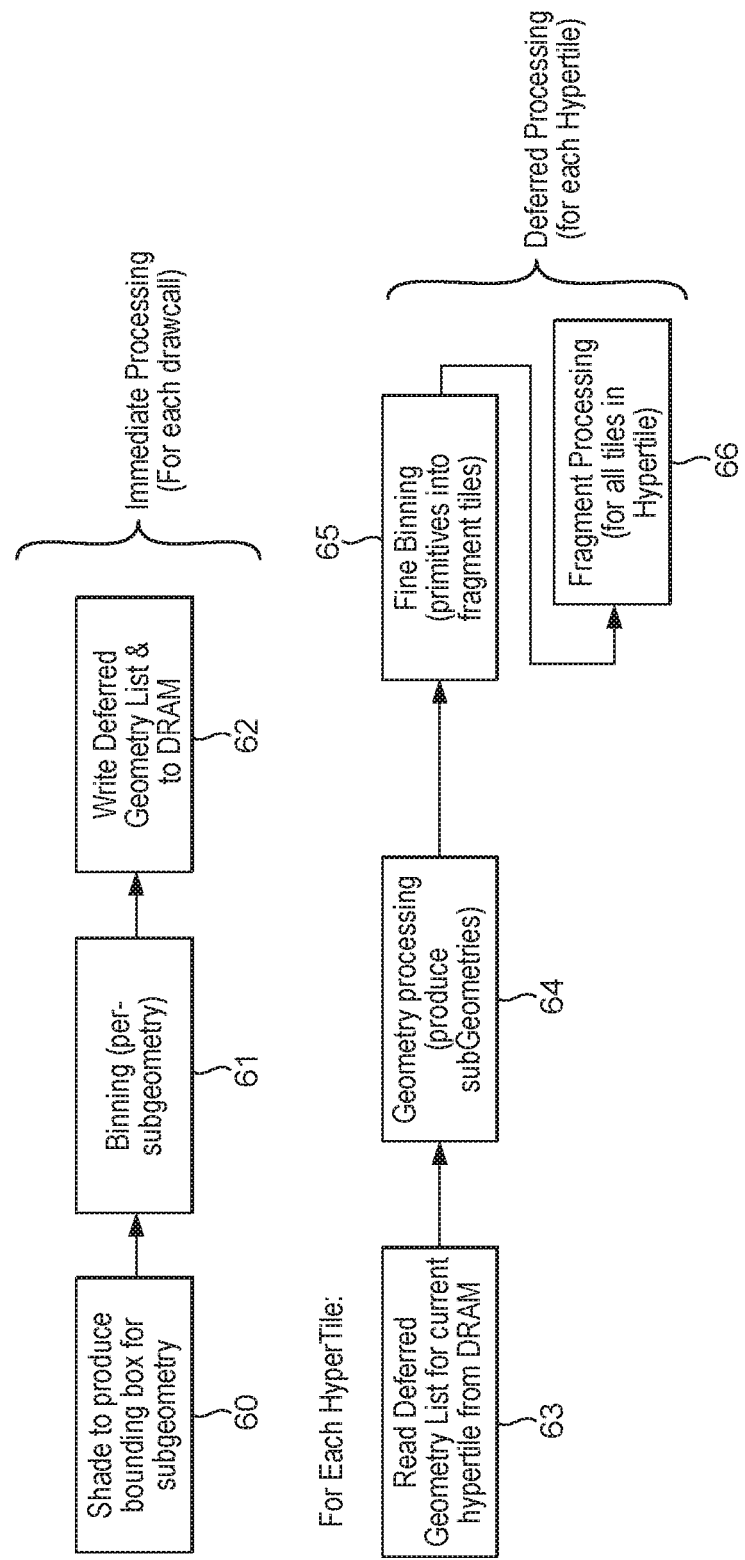
FIG. 5 illustrates schematically the processing flow according to an embodiment.

As shown in FIG. 5, the initial ("immediate") processing pass for each draw call in the present embodiment thus involves executing a shader to produce a screen space bounding box representation for each set of geometry from the bounding box provided for the sets of geometry by the application (step 60), and then performing a coarse "hypertiling" operation using the transformed bounding box representations of the sets of geometry to determine which bounding box representations intersect which hypertiles (and hence which sets of geometry may need to be processed for which of the hypertiles) (step 61). A corresponding set of hypertile lists are thus generated and written out to the external memory system 6 (step 62).

Each hypertile can then be processed independently. For each hypertile, the corresponding hypertile list is read to identify which geometry is required to be processed, and all of the geometry data including the vertex data is then obtained at this point, and the geometry processing and rendering is then carried out for the hypertile, e.g. in a similar manner as described above.

In particular, in the present embodiment the rendering of each hypertile is performed in a tile-based manner, and thus involves sorting the geometry for the hypertile into respective rendering tiles into which the hypertile has been divided, and then rasterising/rendering the geometry accordingly.

Thus, the processing for each hypertile involve first reading in the hypertile list from memory (step 63), and then performing the geometry processing (e.g. vertex shading, etc.) (step 64) and a per polygon tiling operation (step 65) wherein the polygons are sorted into rendering tiles. The fragment processing is then performed as described above in a further processing pass (step 66) to render the tiles.

Thus, in this case, there are in effect two sorting operations: a first higher level sorting operation to sort the geometry into the hypertiles, and a second, finer sorting operation to sort the polygons into the respective rendering tiles.

However, other arrangements would be possible. For instance, after the initial higher level sorting has been performed, the rendering of the hypertiles could instead be performed using immediate mode rendering.

Figure 6:
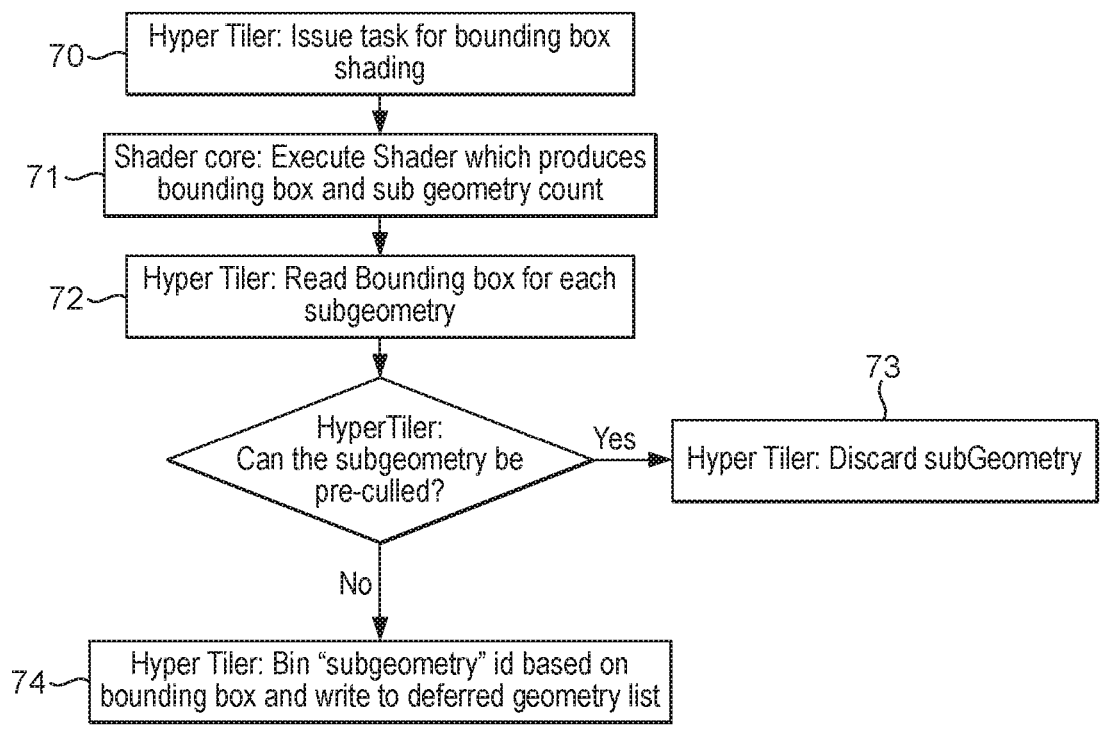
FIGS. 6, 7, 8 and 9 schematically show a "hypertiling" operation according to an embodiment.

FIG. 6 is a flowchart illustrating the hypertiling operation according to the present embodiment.

When a bounding box representation is received by the hypertiling circuit, the hypertiling circuit first issues a task for shading the bounding box, i.e. to convert the bounding box from the user space format in which it was initially specified by the application (and hence provided to the graphics processor) into the desired screen space (step 70). A shader core then executes a suitable shader program in order to produce a transformed bounding box (step 71).

The hypertiling circuit can then read the transformed bounding boxes (step 72) in order to perform the hypertiling/sorting operation. As part of this, the hypertile circuit can initially check whether any of the geometry can be discarded at this stage (pre-culled), e.g. by checking whether the bounding box representation falls entirely outside of a desired view frustum. If the bounding box representation falls entirely outside of a desired view frustum, the geometry can be discarded without any further processing (step 73).

On the other hand if the geometry cannot be discarded, the hypertiling operation is then performed to sort the geometry into the respective hypertiles, and to thereby generate the hypertile lists (step 74).

Figure 7:
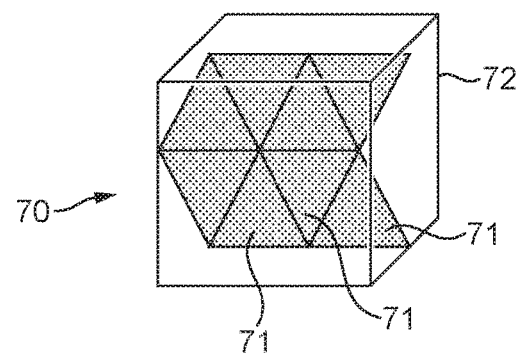
Figure 8:
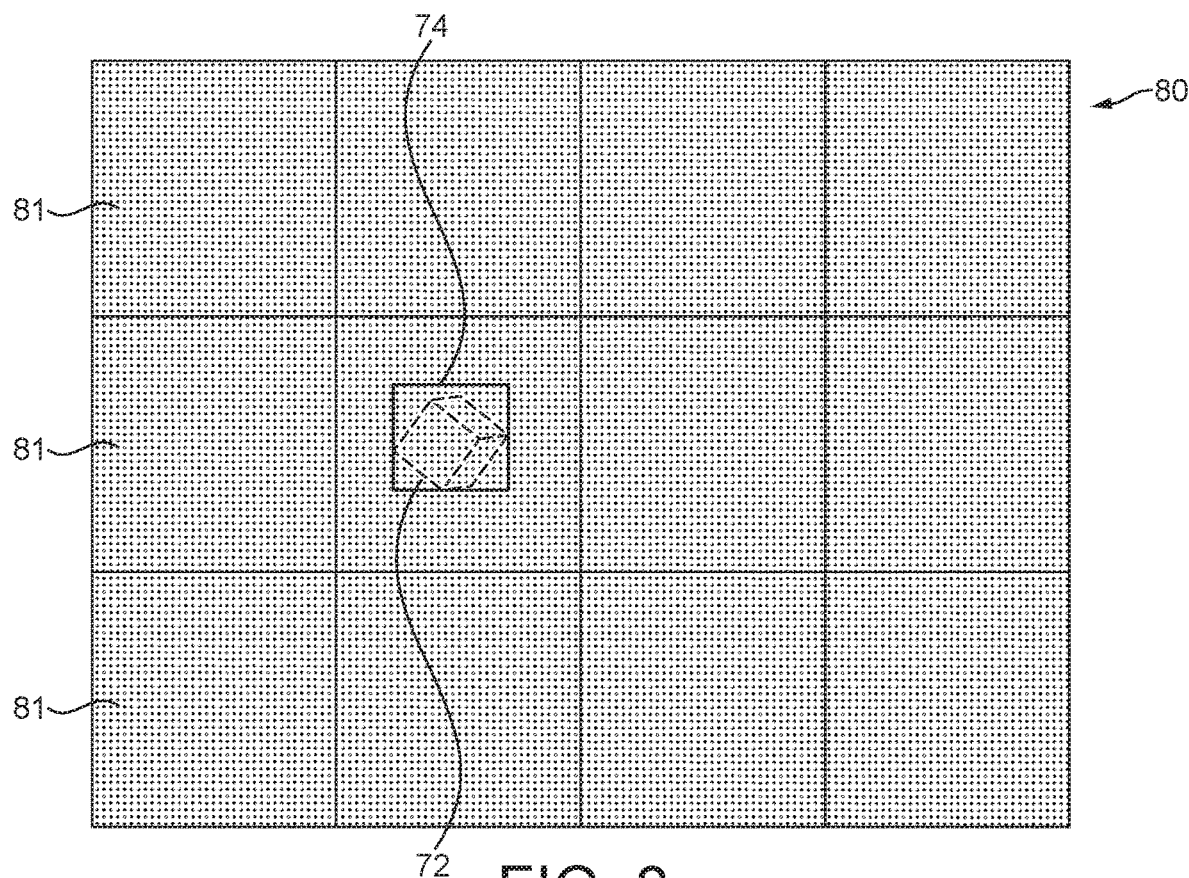
Figure 9:
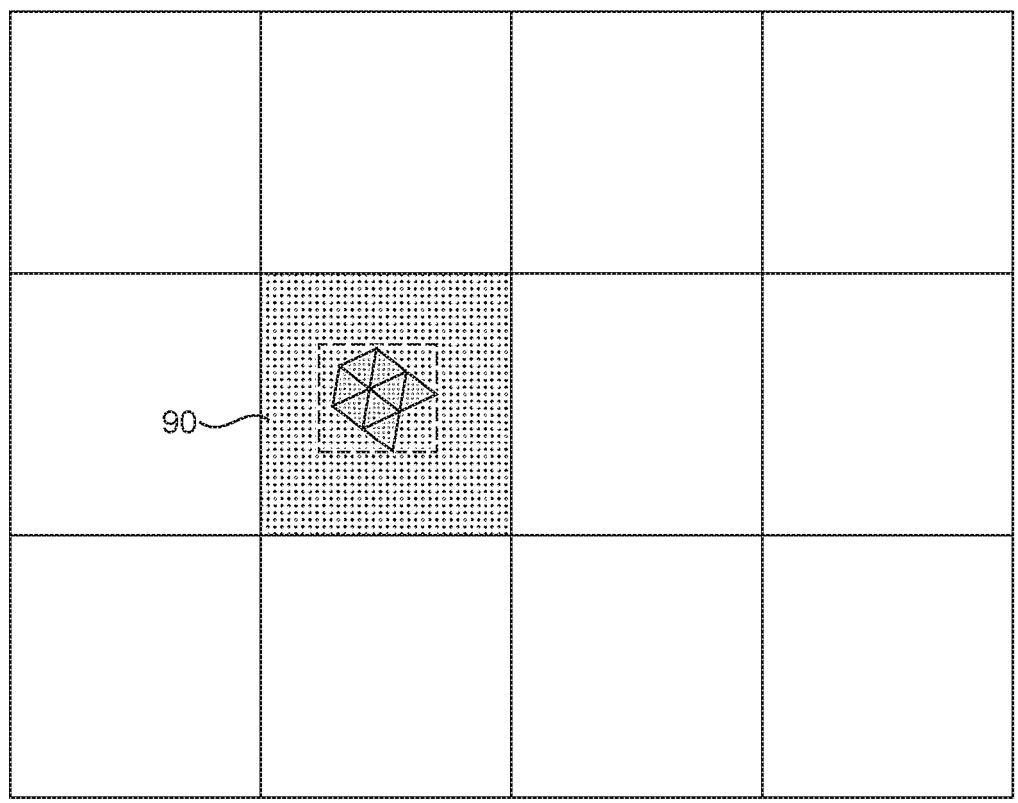

FIGS. 7 to 9 illustrate the hypertiling operation in more detail. FIG. 7 shows schematically an example of a set of geometry 70 which in this case comprises a meshlet of eight connected triangles 71 (and their associated vertices). FIG. 7 also shows a user space bounding box 72 that has been specified by the application for the set of geometry 70 in question. A bounding box shading operation is thus performed to transform the model space bounding box representation into the screen space.

FIG. 8 shows an example of a render output (e.g. frame) 80 that is divided into a grid of rectangular hypertiles 81. FIG. 8 also shows the position of the set of geometry 70 within the render output. In particular, FIG. 8 shows the positions of both the user space bounding box 72 and the transformed screen space bounding box 74 generated from the initial bounding box shading operation described above.

In this example, as shown in FIG. 9, the transformed bounding box representation fits entirely within a single hypertile and is thus added to the respective hypertile list for that hypertile.

Of course a set of geometry may fall into multiple hypertiles. In that case, the geometry could be added to a respective hypertile list for each hypertile. Or, in such cases, the set of geometry may be sorted differently, e.g. into a different data structure, or in some examples by performing a more traditional tiling operation (in which case there may be a set of hypertile lists and a set of tile lists for the render output that are maintained in parallel and both need to be used when rendering the hypertiles.

This hypertiling operation is then repeated for each set of geometry for the draw call in question in order to generate the complete hypertile lists.

A significant difference between the hypertiling operation in the present embodiment and the more "conventional" tiling described in FIGS. 2 and 3 is that in the present embodiment the graphics processor is provided with a higher level representation of the position of the set of geometry (e.g. a meshlet), which in the present embodiment is then transformed to the screen space (although it would also be possible for the representation to be provided in screen space), and the transformed representation is then used to sort the corresponding set of geometry into hypertiles accordingly, rather than the graphics processor loading the vertices, transforming the vertex positions, then generating screen space bounding boxes and then doing the (rendering tile) tiling operation.

In other words, in the present embodiment, a coarse position representation (e.g. bounding box) is provided by the application, rather than the graphics processor generating bounding boxes for the tiling process only after it has transformed the polygons (their vertices) to the screen space, with the graphics processor then solely transforming the model space bounding boxes to the screen space for the hypertiling operation.

As described above, once the graphics processor has transformed the e.g. bounding boxes, for the e.g. meshlets, to screen space, there is thus then be a "hypertiler" stage/circuit that operates to sort the bounding boxes into the hypertiles and to generate hypertile lists of geometry (meshlets), in the same manner as would be done for "conventional" tiling (but by using the bounding boxes and the hypertiles instead).

The effect of this then is that the geometry to be processed for the render output can be sorted into hypertiles while doing much less geometry processing to achieve that (and correspondingly deferring the geometry work of transforming the individual vertex positions, for example).

Correspondingly, an aspect of this is that the hypertiling process operates to transform positions for bounding boxes and does not itself generate the bounding boxes on the graphics processor, and so avoids the need for the initial hypertiling stage to touch or use the actual vertex positions and vertex attributes at all. (Once the graphics processor has to use the actual vertex positions, e.g. if it was to itself derive bounding boxes for the sets of polygons (meshlets) itself, then the advantage is lost, because the graphics processer would then be having to load and process geometry (the vertex positions) to do the hypertiling in a similar way to current "conventional" tiling arrangements.)

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor to process sets of geometry for an application in order to generate a render output for the application, the method comprising:
   when processing plural sets of geometry for the render output, wherein each set of geometry is associated with respective lower level geometry data that is to be used when rendering the set of geometry, the associated lower level geometry data for a set of geometry including vertex data representing a set of vertices for the geometry in the set of geometry, and wherein each set of geometry is further associated with a higher level representation of the position of the set of geometry, the higher level representation of the position of the set of geometry being separate and in addition to the associated lower level geometry data for the set of geometry and being obtainable by the graphics processor independently of the associated lower level geometry data:
   for each set of geometry to be processed:
   the graphics processor obtaining the higher level representation of the position of the set of geometry; and
   the graphics processor determining, using the higher level representation of the position of the set of geometry, which region or regions of a plurality of regions into which the render output has been divided, the set of geometry should be processed for, wherein each region comprises a respective area of the render output;
   the graphics processor thereby generating one or more lists indicating which sets of geometry should be processed for which regions of the render output;
   the method further comprising:
   after the one or more lists indicating which sets of geometry should be processed for which regions of the render output have been generated:
   for a region of the render output to be rendered:
   determining using the respective list(s) for the region of the render output which sets of geometry should be processed for the region of the render output;
   obtaining the associated lower level geometry data for each of the sets of geometry that are indicated to be processed for the region, the obtained lower level geometry data including the vertex data representing the vertices for the geometry in the sets of geometry that are indicated to be processed for the region; and
   processing the obtained lower level geometry data to generate a render output.

2. The method of claim 1, wherein the higher level representations of the positions for the sets of geometry are specified by the application.

3. The method of claim 1, wherein the higher level representation of the position of a set of geometry comprises a bounding box that includes the set of geometry, and wherein the step of determining which regions of a plurality of regions into which the render output has been divided for rendering the set of geometry should be processed comprises determining which regions are at least partially covered by the bounding box.

4. The method of claim 1, further comprising the graphics processor culling any sets of geometry whose higher level representation of the position falls outside of a desired view frustum.

5. The method of claim 1, wherein the higher level representations are provided in a first format and wherein the step of determining which regions of the render output the set of geometry should be processed for comprises a step of converting the higher level representations from the first format into a screen space format.

6. The method of claim 1, wherein each set of geometry comprises a group of plural polygons.

7. The method of claim 1, comprising rendering a plurality of regions in parallel.

8. The method of claim 1, wherein the processing of the sets of geometry to generate a render output is performed using immediate mode rendering.

9. The method of claim 1, wherein the processing of the sets of geometry to generate a render output is performed using tile-based rendering, wherein each of the regions that the render output was divided into for sorting is subdivided into a plurality of rendering tiles, each rendering tile representing a sub-area of the render output region, and wherein the rendering of a region comprises a step of preparing a set of one or more tile list(s) indicating which of the sets of geometry that have been indicated to be processed for the region should be processed for which of the rendering tiles.

10. A non-transitory computer readable medium having executable instructions stored thereon, the instructions when executing on a data processor perform a method of operating a graphics processor to process sets of geometry for an application in order to generate a render output for the application, the method comprising:
when processing plural sets of geometry for the render output, wherein each set of geometry is associated with respective lower level geometry data that is to be used when rendering the set of geometry, the associated lower level geometry data for a set of geometry including vertex data representing a set of vertices for the geometry in the set of geometry, and wherein each set of geometry is further associated with a higher level representation of the position of the set of geometry, the higher level representation of the position of the set of geometry being separate and in addition to the associated lower level geometry data for the set of geometry and being obtainable by the graphics processor independently of the associated lower level geometry data:
for each set of geometry to be processed:
the graphics processor obtaining the higher level representation of the position of the set of geometry; and
the graphics processor determining, using the higher level representation of the position of the set of geometry, which region or regions of a plurality of regions into which the render output has been divided, the set of geometry should be processed for, wherein each region comprises a respective area of the render output;
the graphics processor thereby generating one or more lists indicating which sets of geometry should be processed for which regions of the render output;

the method further comprising:
after the one or more lists indicating which sets of geometry should be processed for which regions of the render output have been generated:
for a region of the render output to be rendered:
determining using the respective list(s) for the region of the render output which sets of geometry should be processed for the region of the render output;
obtaining the associated lower level geometry data for each of the sets of geometry that are indicated to be processed for the region, the obtained lower level geometry data including the vertex data representing the vertices for the geometry in the sets of geometry that are indicated to be processed for the region; and
processing the obtained lower level geometry data to generate a render output.

11. A graphics processor operable to process sets of geometry for an application in order to generate a render output for the application, the graphics processor including:
a sorting circuit that is configured to:
when processing plural sets of geometry for a render output, wherein each set of geometry is associated with respective lower level geometry data that is to be used when rendering the set of geometry, the associated lower level geometry data for a set of geometry including vertex data representing a set of vertices for the geometry in the set of geometry, and wherein each set of geometry is further associated with a higher level representation of the position of the set of geometry, the higher level representation of the position of the set of geometry being separate and in addition to the associated lower level geometry data for the set of geometry and being obtainable by the graphics processor independently of the associated lower level geometry data:
for each set of geometry to be processed:
cause the graphics processor to obtain the higher level representation of the position of the set of geometry;
determine, using the higher level representation of the position of the set of geometry, which region or regions of a plurality of regions into which the render output has been divided the set of geometry should be processed for, wherein each region comprises a respective area of the render output; and
thereby generate one or more lists indicating which sets of geometry should be processed for which regions of the render output;
the graphics processor further including a rendering circuit that is configured to render regions of the render output by:
for each region to be rendered:
the rendering circuit determining using the respective list(s) for the region of the render output which sets of geometry should be processed for the region of the render output;
the rendering circuit obtaining the associated lower level geometry data for each of the sets of geometry that are indicated to be processed for the region, the obtained lower level geometry data including the vertex data representing the vertices for the geometry in the sets of geometry that are indicated to be processed for the region; and
the rendering circuit processing the obtained lower level geometry data to generate a render output.

12. The graphics processor of claim 11, wherein the higher level representations of the position for the sets of geometry are specified by the application.

13. The graphics processor of claim 11, wherein the higher level representation of the position of a set of geometry comprises a bounding box that includes the set of geometry, and wherein the sorting circuit is configured to determine which regions of a plurality of regions into which the render output has been divided for rendering the set of geometry should be processed by determining which regions are at least partially covered by the bounding box.

14. The graphics processor of claim 11, wherein the sorting circuit is further configured to cull any sets of geometry whose higher level representation of the position falls outside of a desired view frustum.

15. The graphics processor of claim 11, wherein the higher level representation is provided in a first format and wherein the graphics processor includes a shading circuit that is configured to transform the higher level representation from the first format into a screen space format, and wherein the sorting circuit determines which region or regions of a plurality of regions into which the render output has been divided the set of geometry should be processed for using the transformed representation.

16. The graphics processor of claim 11, wherein each set of geometry comprises a group of plural polygons.

17. The graphics processor of claim 11, wherein the graphics processing system includes a plurality of rendering circuits configured to render a plurality of regions in parallel.

18. The graphics processor of claim 11, wherein the rendering circuit is configured to perform immediate mode rendering.

19. The graphics processor of claim 11, wherein the rendering circuit is configured to perform tile-based mode rendering, wherein each of the regions that the render output was divided into for sorting is subdivided into a plurality of rendering tiles, each rendering tile representing a sub-area of the render output region, and wherein the rendering circuit comprises a tiling circuit that is configured to prepare a set of one or more tile list(s) indicating which of the sets of geometry that have been indicated to be processed for the region should be processed for which of the rendering tiles.

20. A graphics processing system comprising: one or more host processor for executing an application; and the graphics processor of claim 11, the graphics processor operable to process sets of geometry for the application executing on the one or more host processor.

21. A method of operating a graphics processor to process sets of geometry for an application in order to generate a render output for the application, the method comprising:
when processing plural sets of geometry for the render output, wherein each set of geometry is associated with respective lower level geometry data that is to be used when rendering the set of geometry, the associated lower level geometry data for a set of geometry including vertex data representing a set of vertices for the geometry in the set of geometry, and wherein each set of geometry is further associated with a higher level representation of the position of the set of geometry, the higher level representation of the position of the set of geometry being separate and in addition to the associated lower level geometry data for the set of geometry and being obtainable by the graphics processor independently of the associated lower level geometry data:
for a set of geometry to be processed:
the graphics processor obtaining the higher level representation of the position of the set of geometry; and
the graphics processor determining, using the higher level representation of the position of the set of geometry, which region or regions of a plurality of regions into which the render output has been divided, the set of geometry should be processed for, wherein each region comprises a respective area of the render output.

\* \* \* \* \*